(12) United States Patent
Albert

(10) Patent No.: US 6,318,326 B1
(45) Date of Patent: Nov. 20, 2001

(54) VACUUM DEVICE FOR COMBUSTION AIR SUPPLY OF AN INTERNAL COMBUSTION ENGINE

(75) Inventor: Werner Albert, Königslutter (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 09/582,546

(22) PCT Filed: Dec. 22, 1998

(86) PCT No.: PCT/EP98/08458

§ 371 Date: Jun. 28, 2000

§ 102(e) Date: Jun. 28, 2000

(87) PCT Pub. No.: WO99/35392

PCT Pub. Date: Jul. 15, 1999

(30) Foreign Application Priority Data

Jan. 2, 1998 (DE) .............................................. 198 00 061

(51) Int. Cl.⁷ ...................................................... F02M 35/10
(52) U.S. Cl. ................... 123/184.42; 123/184.53
(58) Field of Search ........................ 123/184.32, 184.42, 123/184.47, 184.53

(56) References Cited

FOREIGN PATENT DOCUMENTS

| 737250 | * | 7/1943 | (DE). |
|---|---|---|---|
| 19 33 100 | | 1/1970 | (DE). |
| 28 31 985 | | 2/1980 | (DE). |
| 27 02 160 C2 | | 9/1982 | (DE). |
| 35 03 830 A1 | | 8/1985 | (DE). |
| 37 30 817 C2 | | 6/1989 | (DE). |
| 35 30 817 | | 5/1994 | (DE). |

* cited by examiner

*Primary Examiner*—Noah P. Kamen
(74) *Attorney, Agent, or Firm*—Cohen, Pontani, Lieberman & Pavane

(57) ABSTRACT

A suction system for a combustion air supply to an internal combustion engine, in particular for a motor vehicle, having an induction funnel which at an open end has an induction pipe, and an air manifold, on which cylinder-specific suction pipe arms, which can be connected to a cylinder head of the internal combustion engine, are arranged. In this system, the induction funnel and the air manifold are formed in a common housing. A partition of the housing separates the induction funnel from the air manifold.

6 Claims, 6 Drawing Sheets

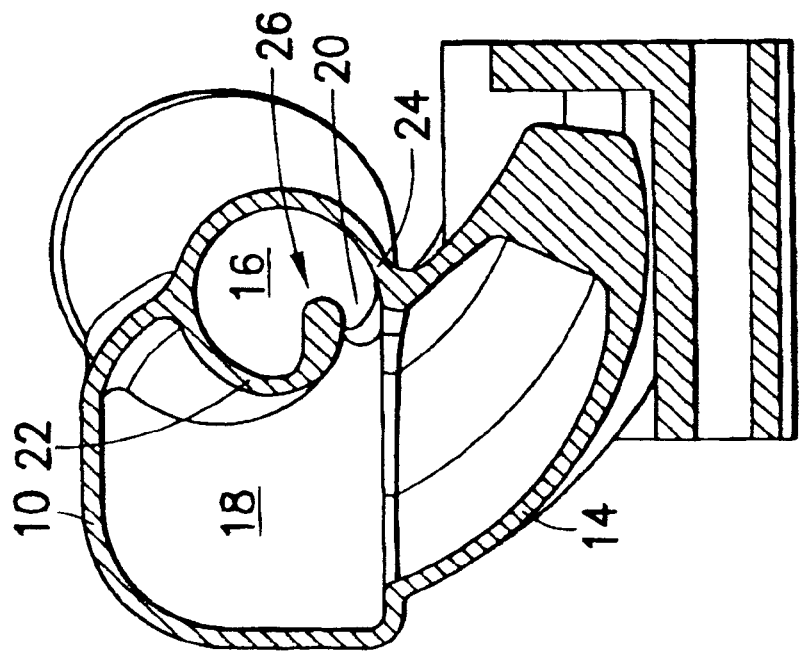
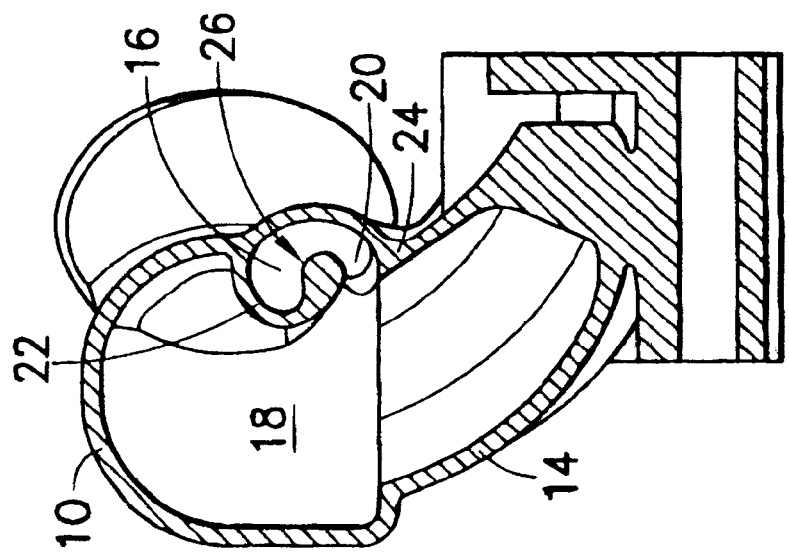

VACUUM DEVICE FOR COMBUSTION AIR SUPPLY OF AN INTERNAL COMBUSTION ENGINE

BACKGROUND OF THE INVENTION

1. Field of the Invention

The invention relates to a suction system for a combustion air supply to an internal combustion engine, in particular for a motor vehicle, having an induction funnel which at an open end has an induction pipe, and an air manifold, on which cylinder-specific suction pipe arms, which can be connected to a cylinder head of the internal combustion engine, are arranged.

2. Discussion of the Prior Art

In suction systems of this nature, with construction spaces which are becoming increasingly optimized or with an available structural space in an engine compartment becoming increasingly small, the problem arises of how to provide sufficient and, above all, uniform supply of combustion air to individual cylinders of the internal combustion engine. For reasons of gas dynamics, sharp diversions of an intake air flow were previously to be avoided or were associated with considerable disadvantages, since the result is pressure losses and an uneven distribution of the intake air, for example in the air manifold.

SUMMARY OF THE INVENTION

The present invention is therefore based on the object of providing an improved suction system of the type described above in which the above-mentioned drawbacks are overcome and a component which is optimized in terms of its structural volume is provided while, at the same time, avoiding pressure losses.

For this purpose, according to the invention the induction funnel and the air manifold are formed in a common housing, a partition of the housing separating the induction funnel from the air manifold.

This has the advantage that a compact, integral arrangement which requires less structural space is created by the fact that the induction funnel and air manifold are arranged close together.

To utilize in particular structural spaces which are long rather than wide, the induction funnel and the air manifold, in the common housing, are designed in such a manner that they extend substantially parallel, in particular axially parallel, to one another. This results in a correspondingly elongate component.

In a particularly preferred embodiment of the invention, a slot which connects the induction funnel to the air manifold is formed in the partition, which slot preferably extends substantially parallel, in particular axially parallel, with respect to the induction funnel and/or the air manifold. Advantageously the partition, on a side which extends substantially parallel, in particular axially parallel, with respect to the induction funnel and/or the air manifold ends, at a predetermined distance from a housing wall, with a free end which forms the slot, which free end, in an advantageous configuration, is designed in the form of a bead as seen in cross section. As a result, a uniform transfer of air without pressure losses and with a good air/EGR uniform distribution is ensured over the entire longitudinal extent of the induction funnel or air manifold despite the fact that the intake air flow is diverted sharply in order to optimize the structural space. In this context, "EGR" means exhaust gas recirculation into the intake air flow.

This effect is promoted still further by the fact that the induction funnel has a cross-sectional profile which narrows in the direction away from the induction pipe. As a result of the narrowing cross section, a flow velocity of the intake air flow increases with increasing distance from the induction pipe, in accordance with the laws of fluid dynamics and/or because of a constant flow pressure. As a result, the passage of air from the induction funnel to the air accumulator becomes even more uniform over the entire length of the slot.

Further features, advantages and advantageous configurations of the invention are given in the following description of the invention with reference to the appended drawings.

BRIEF DESCRIPTION OF THE DRAWINGS

FIG. 8 in a sectional view on line D—D from FIG. 3;

FIG. 9 in a sectional view on line E—E from FIG. 3.

DETAILED DESCRIPTION OF THE PREFERRED EMBODIMENT

Figure 1:
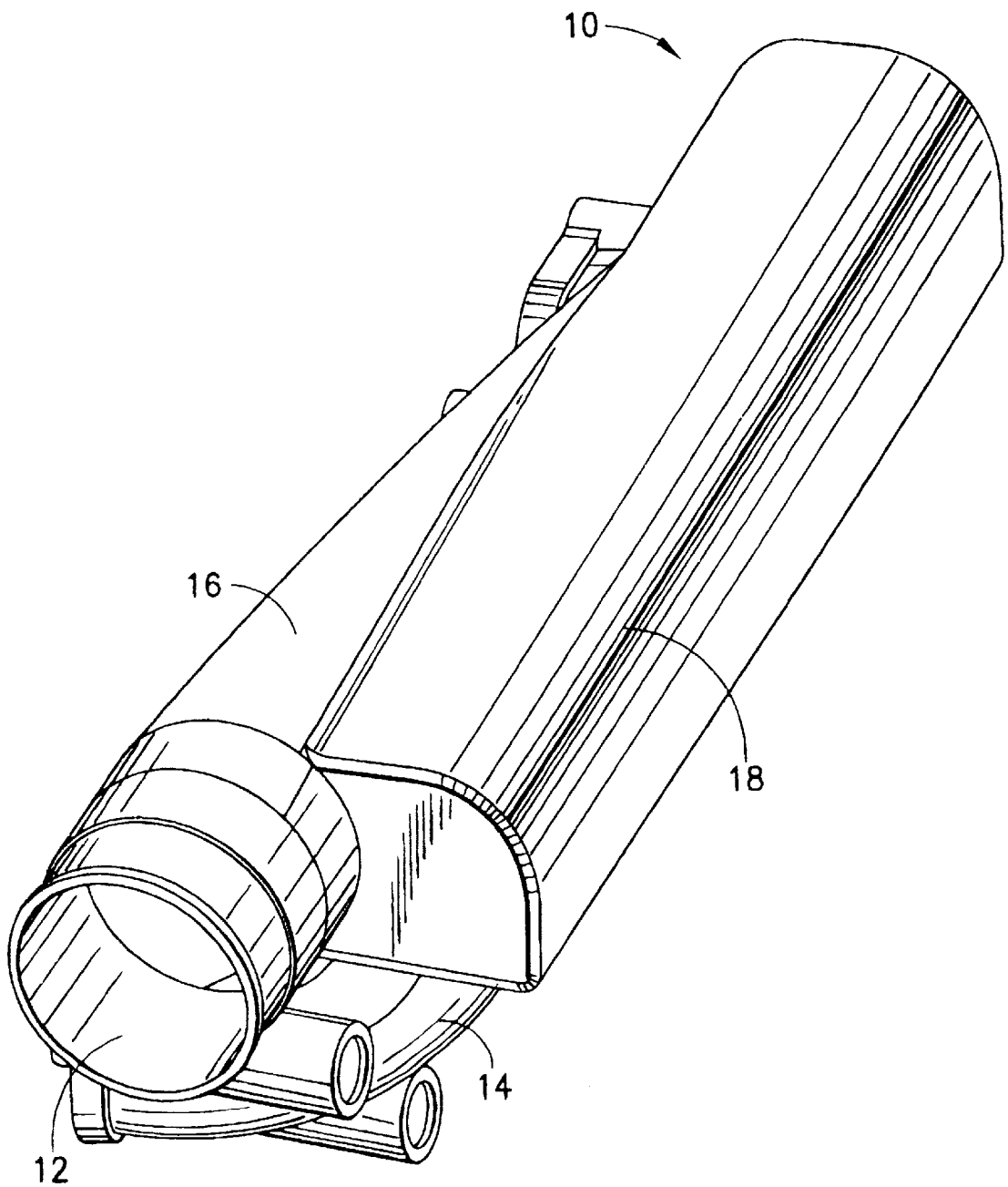
FIG. 1 shows a preferred embodiment of a suction system according to the invention, in a perspective view.
Figure 2:
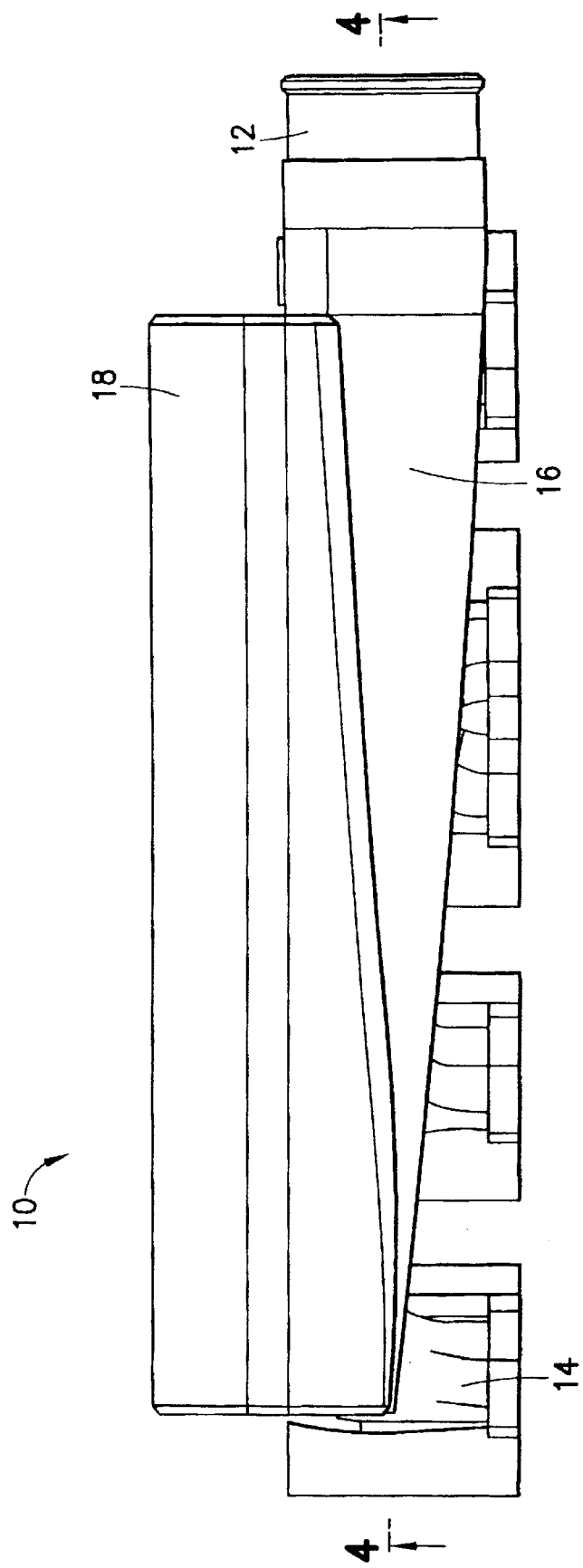
FIG. 2 in plan view.
Figure 3:
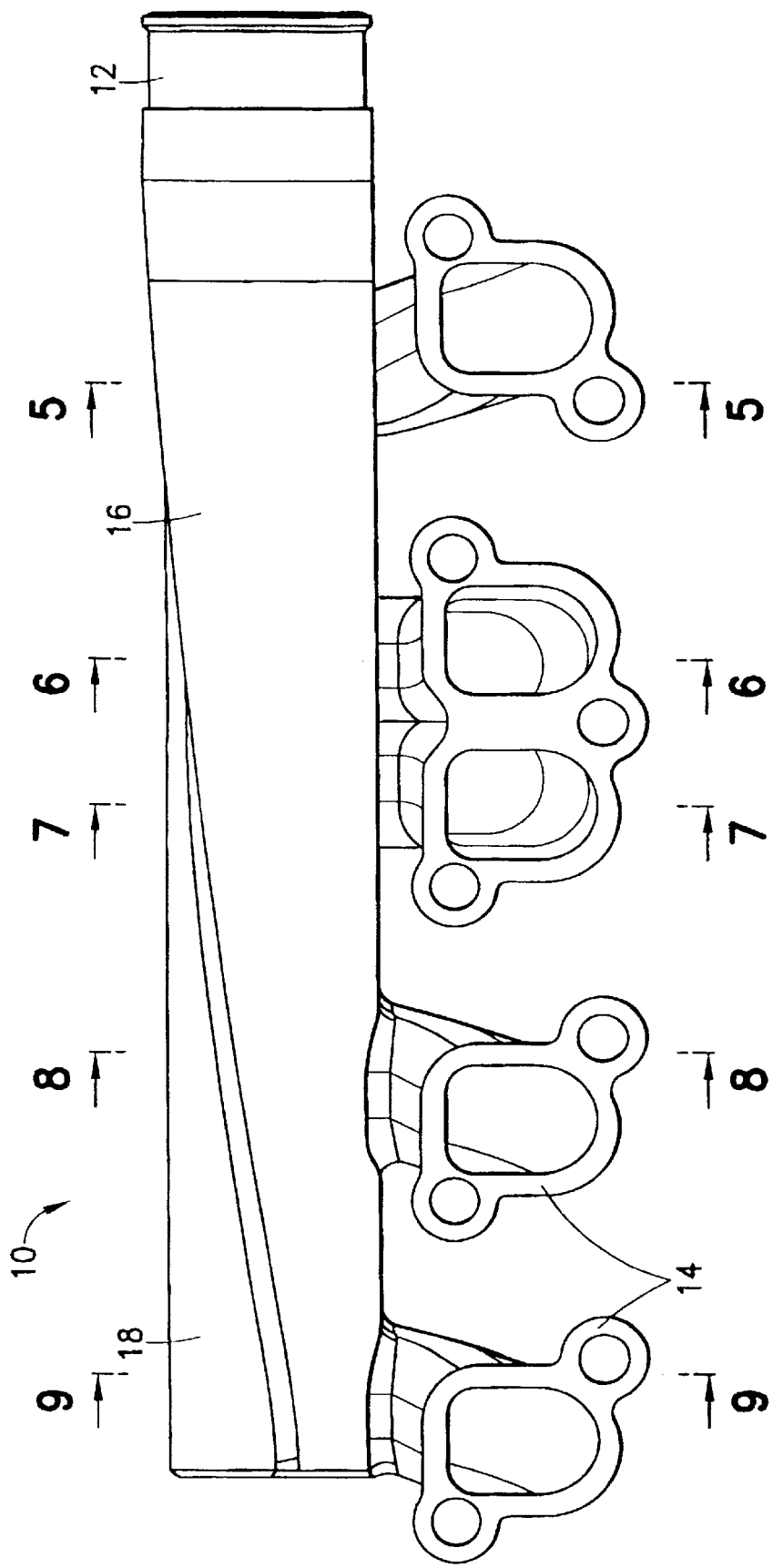
FIG. 3 shows the suction system in side view.
Figure 4:
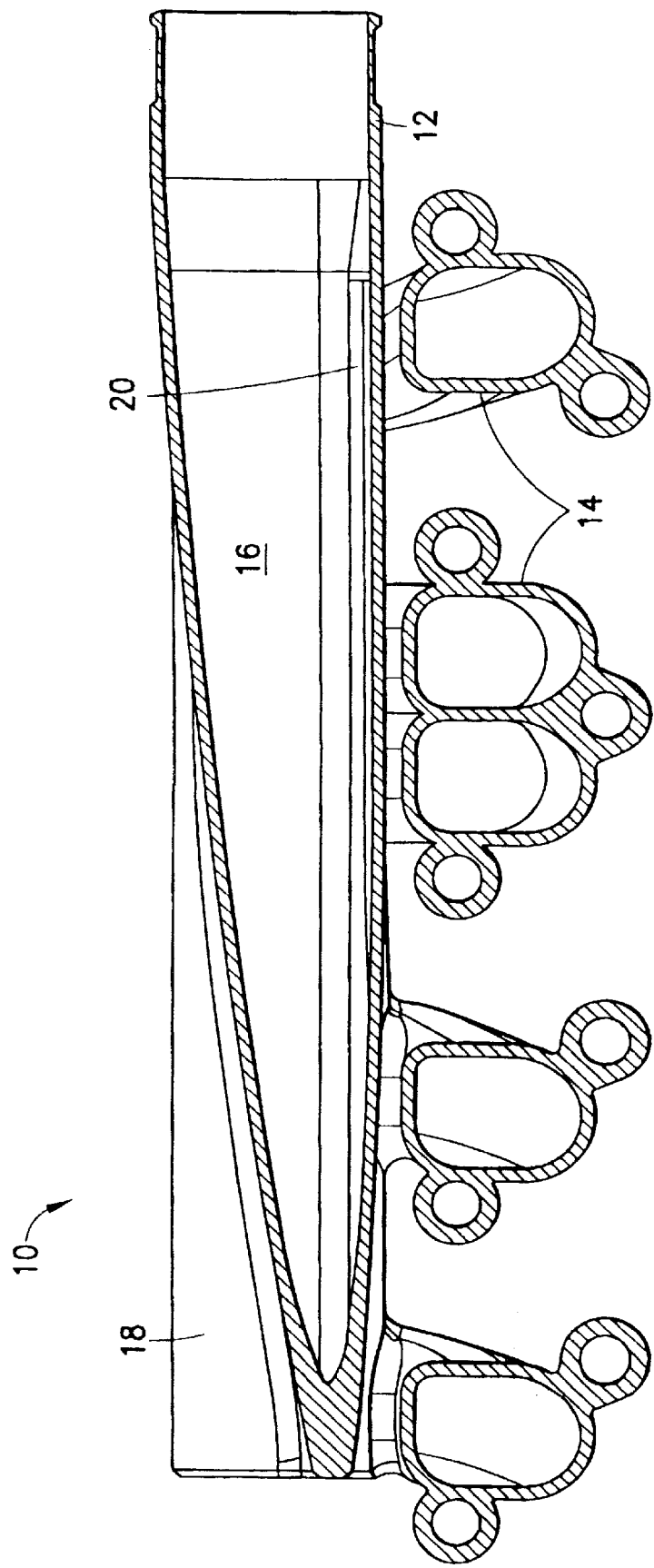
FIG. 4 in a sectional view on line G—G from FIG. 2.
Figure 5:
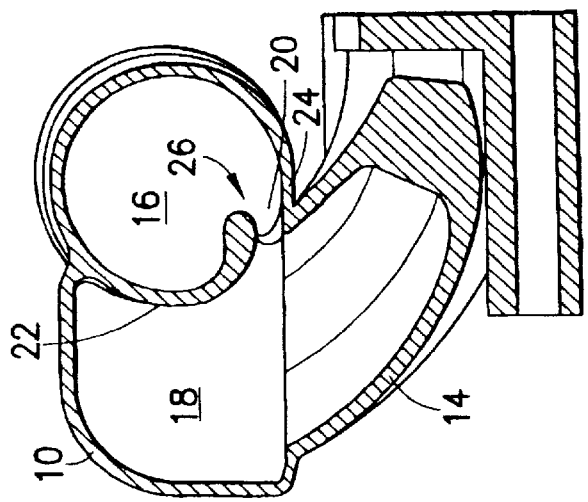
FIG. 5 in a sectional view on line A—A from FIG. 3.
Figure 6:
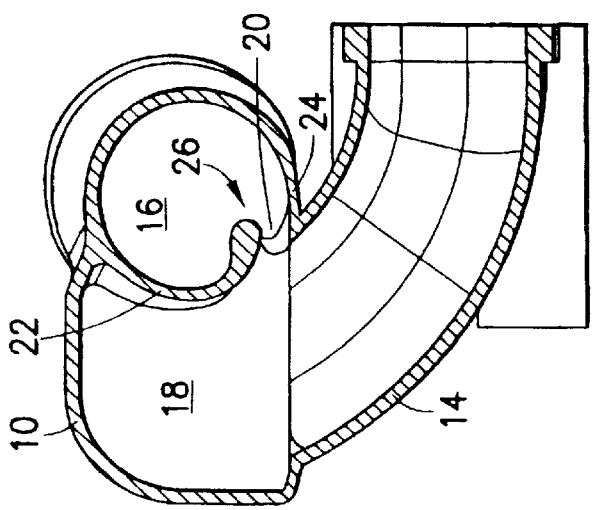
FIG. 6 in a sectional view on line B—B from FIG. 3.
Figure 7:
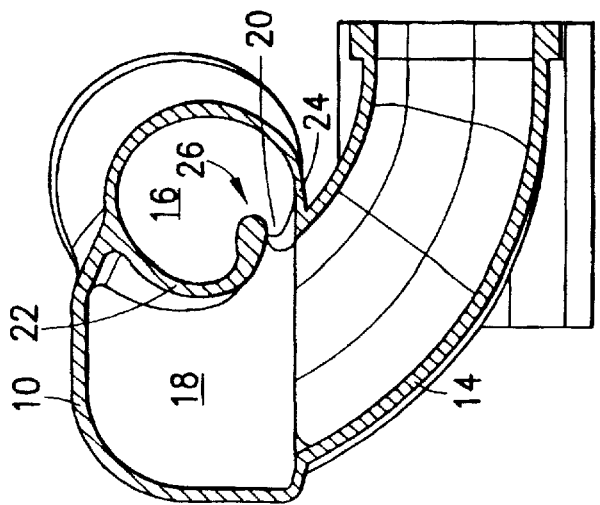
FIG. 7 in a sectional view on line C—C from FIG. 3.

The preferred embodiment of a suction system according to the invention which is illustrated in FIGS. 1 to 3 comprises a housing 10 with an induction pipe 12 and suction-pipe arms 14. One suction pipe arm 14 is provided for each cylinder of an internal combustion engine (not shown). One part of the housing 10 forms an induction funnel 16 and another part of the housing 10 forms the air manifold 18.

As can be seen from FIGS. 4 to 8, the induction funnel 16 narrows at increasing distance from the induction pipe 12. Furthermore, the induction funnel 16 and the air manifold 18 are formed substantially axially parallel or at a small axial angle to one another in the common housing 10. The introduction funnel 16 and the air manifold 18 are connected via a longitudinal slot 20 in a partition 22, which separates the two parts from one another, of the housing 10. A separate suction pipe arm 14 for each cylinder of the internal combustion engine branches off from the air manifold 18.

The longitudinal slot 20 is formed by the partition 22 in such a manner that a longitudinal side of the partition 22 ends at a predetermined distance from a housing wall 24, in the form of a free end 26. This free end 26 is designed in the manner of a bead and projects into the induction funnel 16, in the opposite direction to the direction of flow.

The intake air flows via the induction pipe 12 into the induction funnel 16. The cross-sectional profile of the induction funnel 16 is designed in such a manner that the intake air passes uniformly into the longitudinal slot 20 between the induction funnel 16 and the air manifold 18. The resultant identical intake conditions for each individual cylinder of the internal combustion engine lead to a constant distribution of air to the suction pipe arms 14 and therefore to the cylinders of the internal combustion engine. The cross-sectional area of the longitudinal slot 20 is designed in such a manner that, together with the bead-like contouring of the longitudinal slot 20, a pressure loss when the air flows across from the induction funnel 16 into the air manifold 18 is minimized. From the air manifold, the intake air flows into the suction pipe arms 14 of the individual cylinders in accordance with a firing order oat the cylinders of the internal combustion engine.

The invention is not limited by the embodiments described above which are presented as examples only but can modified in various ways within the scope of protection defined by the appended patent claims.

What is claimed is:

1. A suction system for a combustion air supply to an internal combustion engine, comprising: an induction funnel having an open end with an induction pipe; an air manifold; and cylinder-specific suction pipe arms arranged on the air manifold so as to be connectable to a cylinder head of the internal combustion engine, the induction funnel and the air manifold being formed in a common housing, the housing having a partition arranged to separate the induction funnel from the air manifold, a slot being formed in the partition so as to connect the induction funnel to the air manifold, the partition, on a side which extends substantially parallel with respect to at least one of the induction funnel and the air manifold, ending at a predetermined distance from a wall of the housing with a free end which forms the slot, the free end, as seen in cross-section, being formed as a bead.

2. A suction system as defined in claim 1, wherein the induction funnel and the air manifold are arranged in the common housing so as to extend substantially parallel to one another.

3. A suction system as defined in claim 2, wherein the induction funnel and the air manifold extend axially parallel to one another.

4. A suction system as defined in claim 1, wherein the slot extends substantially parallel with respect to at least one of the induction funnel and the air manifold.

5. A suction system as defined in claim 1, wherein the slot extends axially parallel with respect to at least one of the induction funnel and the air manifold.

6. A suction system for a combustion air supply to an internal combustion engine, comprising: an induction funnel having an open end with an induction pipe; an air manifold; and cylinder-specific suction pipe arms arranged on the air manifold so as to be connectable to a cylinder head of the internal combustion engine, the induction funnel and the air manifold being formed in a common housing, the housing having a partition arranged to separate the induction funnel from the air manifold, the induction funnel having a cross-sectional profile which narrows in a direction away from the induction pipe.

* * * * *